United States Patent

Muller

[11] 3,894,596
[45] July 15, 1975

[54] DRIVE MOTOR GUARD ASSEMBLY FOR VEHICLES

[75] Inventor: Thomas P. Muller, Aurora, Ill.

[73] Assignee: Caterpillar Tractor Co., Peoria, Ill.

[22] Filed: Apr. 13, 1973

[21] Appl. No.: 350,679

[52] U.S. Cl. .............................. 180/9.2; 180/648
[51] Int. Cl. .............................................. B62d 21/18
[58] Field of Search ............ 180/9.2 R, 6.48, 64 R, 180/23, 24.04, 24.07, 52; 248/3; 37/4; 280/150 F

[56] References Cited
UNITED STATES PATENTS

| | | | |
|---|---|---|---|
| 2,413,264 | 12/1946 | Swennes et al. | 248/3 X |
| 2,845,725 | 8/1958 | Robishaw et al. | 180/9.2 R X |
| 3,529,687 | 9/1970 | Pensa | 180/6.48 |
| 3,693,741 | 9/1972 | Scheuerle | 180/23 |
| 3,797,598 | 3/1974 | Wanner | 180/6.48 |

*Primary Examiner*—Trygve M. Blix
*Assistant Examiner*—Barry L. Kelmachter
*Attorney, Agent, or Firm*—Phillips, Moore, Weissenberger Lempio & Strabala

[57] ABSTRACT

A guard assembly for use with a track-type vehicle includes portions for shielding and protecting the drive motors thereof. The guard assembly includes a central box structure which is fixed to the frame of the vehicle. The portions for protecting the drive motors extend outwardly of the box structure, and are attached to the vehicle frame by structure which allow a degree of flexing of these portions relative to the vehicle frame. The assembly includes towline attachment structure directly rearwardly of the box structure.

15 Claims, 5 Drawing Figures

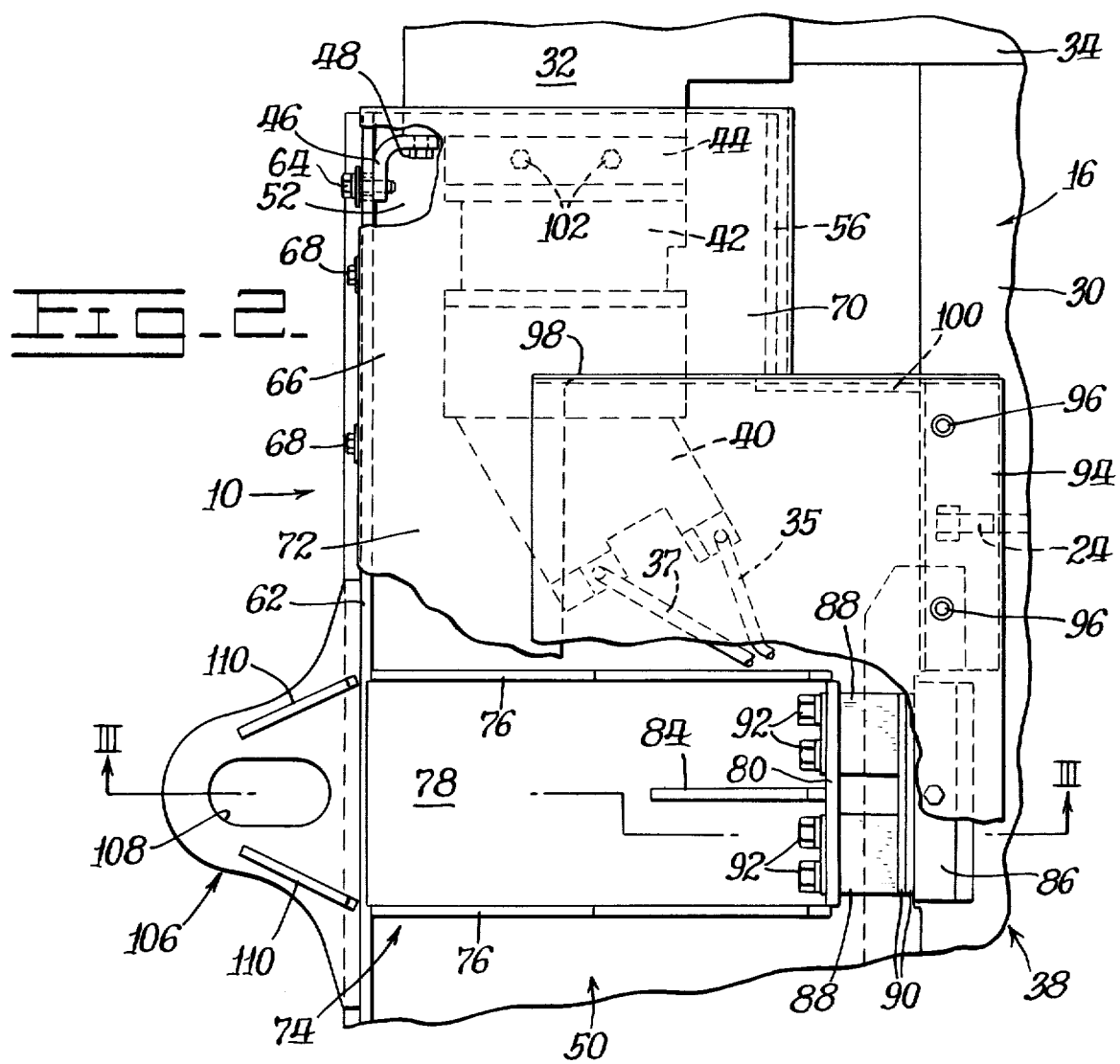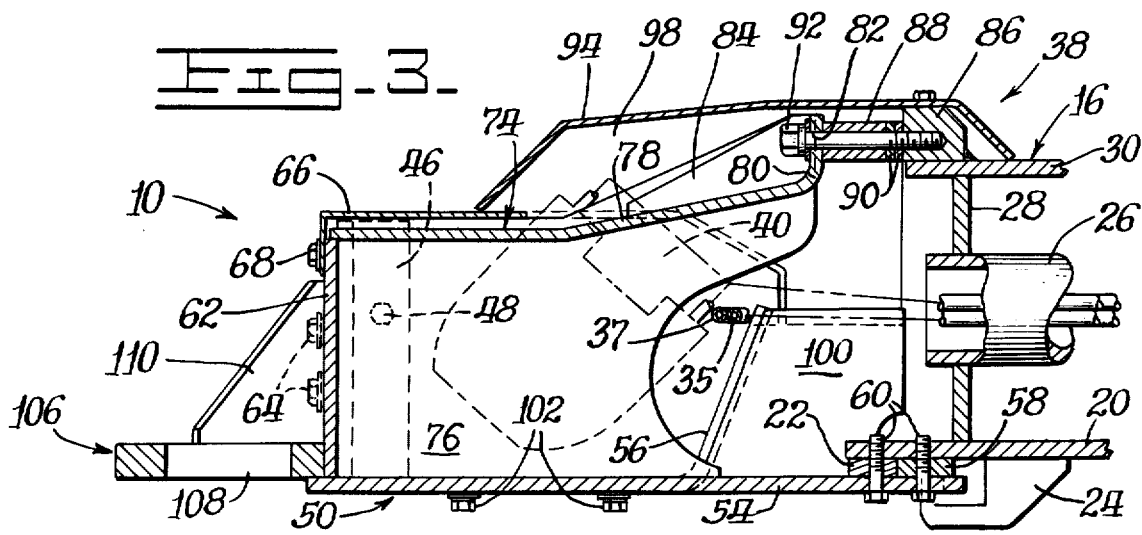

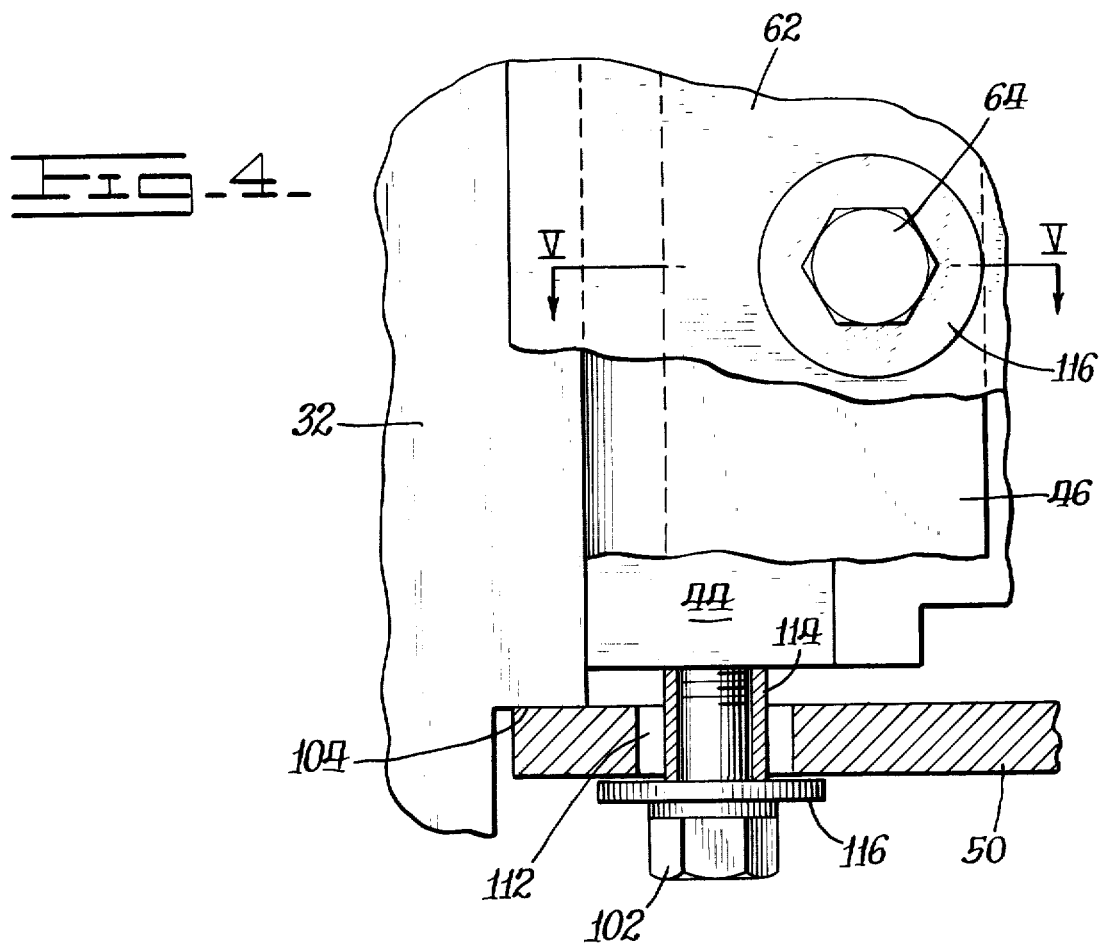
FIG.-4.-
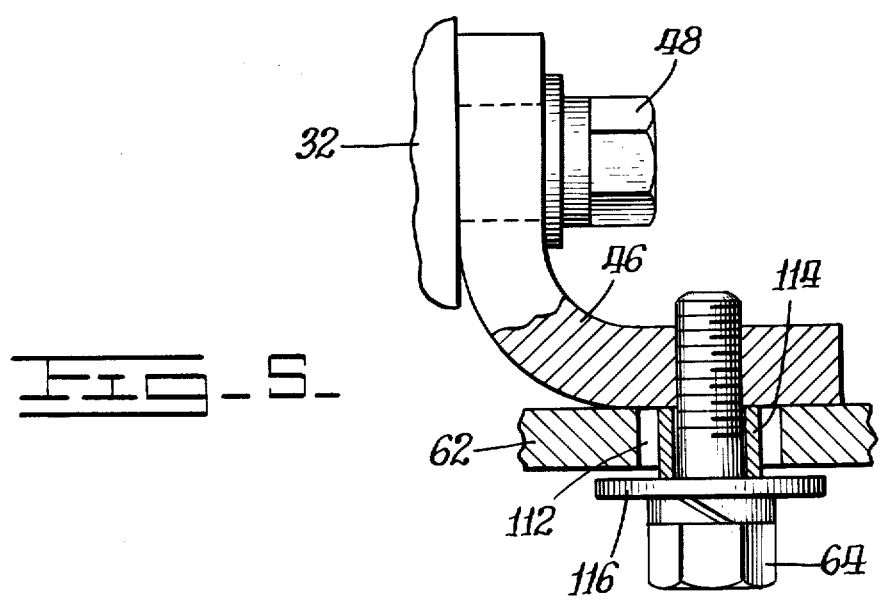
FIG.-5.-

DRIVE MOTOR GUARD ASSEMBLY FOR VEHICLES

BACKGROUND OF THE INVENTION

This invention relates to drive motor guard assemblies for vehicles, and more particularly, to such a guard assembly which includes a central, relatively rigid box structure, and outer motor-protecting portions which are allowed to flex to an extent relative to the vehicle frame.

Conventional hydraulically powered track-type vehicles, such as hydraulic excavators, comprise a pair of track assemblies independently powered by separate drive motors. The drive motors are normally secured to a track roller frame to extend inwardly thereof in a cantilevered manner. Conduits extend between hydraulic controls and the drive motors to selectively communicate hydraulic operating fluid therebetween. The drive motors and conduits are usually unprotected to thus subject them to severe damage by impact with rocks, stumps and the like, and by mud which tends to pack therearound during operation of the vehicle.

Application Ser. No. 240,606 (assigned to the Assignee of this application) discloses a guard assembly for drive motors of a track-type vehicle such as an excavator. Such guard assembly as disclosed therein has been found to overcome a number of these problems. For example, it has been found that adequate protection is afforded the drive motors and conduits associated therewith. However, even though such guard assembly is relatively effective, certain problems continue to exist.

Forces from a towline attachment secured to the rear of the guard assembly are transmitted to the vehicle frame through the guard assembly. The apparatus disclosed in Application Ser. No. 240,606 now U.S. Pat. No. 3,797,598 (assigned to the assignee of the present invention), has been found quite adequate for small vehicles, as long as the forces involved are in a generally horizontal direction. The apparatus disclosed therein, however, is not quite as effective when the towline forces are imposed at an angle to the horizontal, and particularly where the guard assembly is applied to a large, powerful machine.

It has also been found possible to shear some of the bolts mounting the guard assembly to the vehicle frame by direct vertical impact on the lower face of the guard assembly, or by substantial twisting forces applied to the guard assembly.

SUMMARY OF THE INVENTION

It is an object of this invention to provide a drive motor guard assembly for a vehicle which is capable of having applied thereto extremely high towline forces which may be imposed at an angle to the horizontal.

It is a still further object of this invention to provide a drive motor guard assembly for a vehicle which, while fulfilling the above object, allows for a degree of flexing thereof, meanwhile avoiding possible shearing of the mounting bolts of the guard assembly.

It is a still further object of this invention to provide a drive motor guard assembly for a vehicle which, while fulfilling the above objects, provides proper protection for the drive motors of the vehicle, meanwhile being relatively simple in design and construction.

Broadly stated, the invention is in a track-type vehicle disposed for movement along a longitudinal axis thereof. The track-type vehicle comprises a pair of laterally spaced and substantially parallel track assemblies extending in the direction of the axis. A vehicle frame supports the track assemblies. A pair of laterally spaced drive motors are mounted relative to the frame, each motor being operatively connected to one of the track assemblies. A guard assembly is included, and comprises a motor protecting portion, and reinforcing means fixed relative to the motor protecting portion. Means are included for fixing the reinforcing means relative to the frame of the vehicle, to position the motor protecting portion relative to the motors.

BRIEF DESCRIPTION OF THE DRAWINGS

These and other objects of the invention will become apparent from a study of the following specification and drawings, in which:

FIG. 2 is a plan view, with portions removed, and portions broken away, of the guard assembly;

FIG. 3 is a sectional view taken along the line III—III of FIG. 2;

FIG. 4 is an enlarged view, partially in section, showing the means for attaching the guard assembly relative to the vehicle frame; and FIG. 5 is a sectional view taken along the line V—V of FIG. 4.

DESCRIPTION OF THE PREFERRED EMBODIMENT

Figure 1:
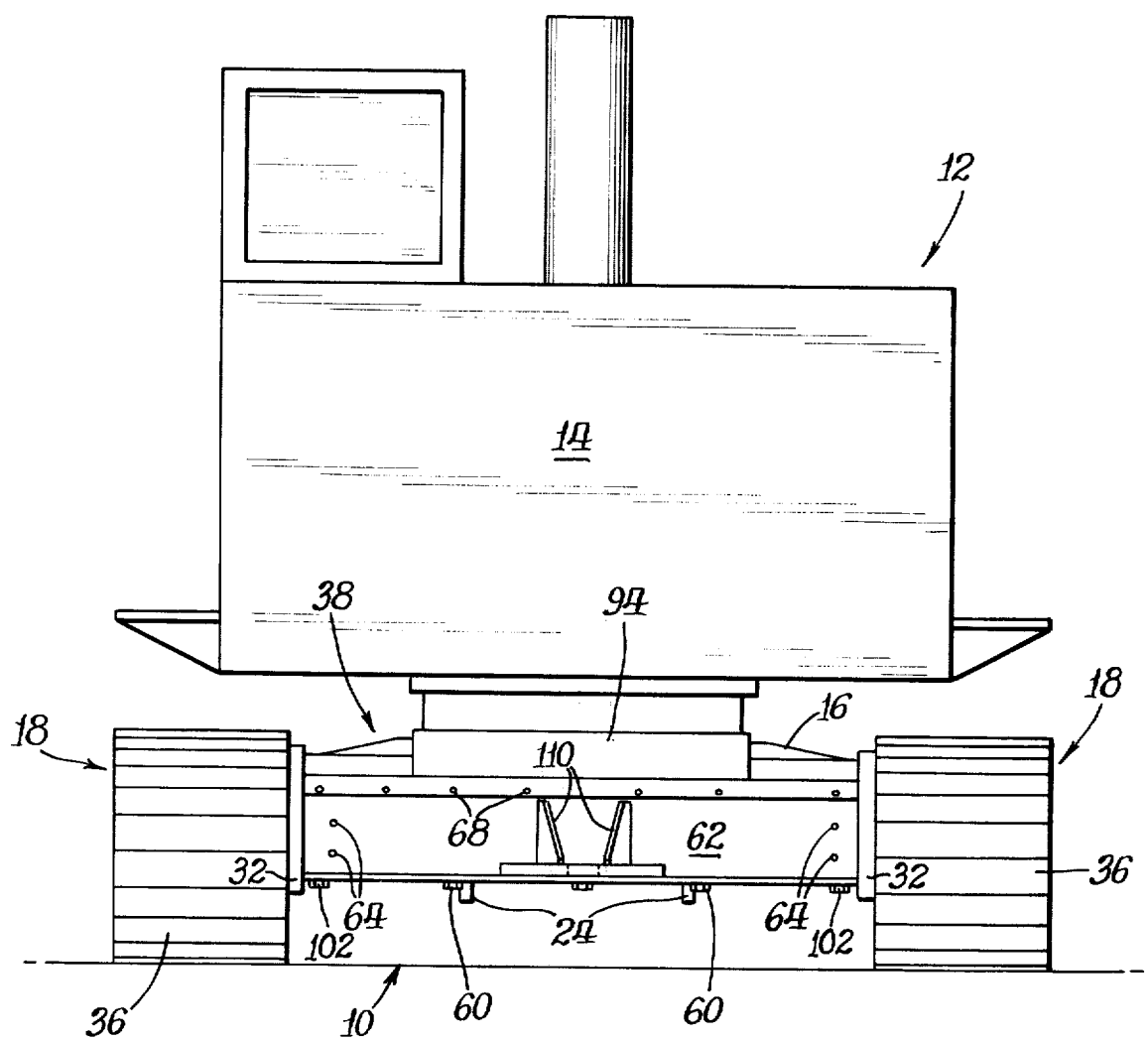
FIG. 1 is a rear elevational view of a hydraulic excavator having a protective guard assembly of the present invention attached thereon to enclose and protect a pair of track drive motors and attendant structures.

Referring to the drawings, a drive motor guard assembly embodying the principles of the present invention is generally indicated by the reference numeral 10 in association with a track-type vehicle such as a hydraulic excavator 12 disposed for movement along a longitudinal axis thereof. The hydraulic excavator 12 has an upper unit 14 mounted on a car body 16 secured between a pair of laterally spaced and substantially parallel endless track assemblies 18 extending in the direction of such axis. As shown in FIGS. 2 and 3, a bottom plate 20 of the car body 16 has a laterally extending shear block 22 secured thereunder by welding or the like. A pair of laterally spaced hooks 24 are also secured beneath the plate 20 forwardly of the shear block 22 to have hook portions thereof point toward the rearward end of the vehicle 12. The car body 16 further includes a tubular housing 26 disposed along the longitudinal axis of the vehicle 12 and supported in part by substantially vertical bulkhead 28 secured between the bottom plate 20 and a top plate 30 of the car body 16.

Each track assembly 18 includes a final drive case 32 secured to a respective track roller frame 34 and an endless track 36 entrained thereabout in the usual manner. The car body 16 and track roller frames 34 are secured together to provide a relatively stationary vehicle frame 38. Each track 36 is driven by an hydraulic motor 40 through a final drive gear transmission (not shown) housed in case 32. Conduit means comprising a pair of conduits 35 and 37 extend through tubular housing 26 of the car body 16 to each drive motor 40 to selectively communicate pressurized hydraulic fluid between the motor 40 and the usual operator control means (not shown). The motors 40 are laterally spaced and are mounted relative to frame 38.

A spring-engaged fluid disengaged brake 42 is interposed each motor 40 and its respective final drive case 32 and is secured thereto by an adapter plate 44. A mounting bracket 46 is secured to the inside rearward edge of each final drive case 32 by capscrews 48 so as to be positioned substantially vertically behind the adapter plate 44.

Guard assembly 10, more clearly shown in FIGS. 2 and 3, includes a bottom guard plate 50 having outwardly extending end portions 52 and a forwardly extending central portion 54. The end portions 52 have upturned forward edge portions 56 which form a part of the enclosure for the motor 40 and the brake 42. A shear block 58 is welded to the terminal end of the central portion 54 for load bearing engagement with shear block 22. The central portion 54 is secured to the car body 16 by a plurality of capscrews 60. A rear wall 62 of the guard assembly 10 is secured by welding to bottom guard plate 50 and is attached to brackets 46 by a plurality of attaching bolts 64, and extends upwardly for attachment of a sheet metal cover 66 by a plurality of capscrews 68. The cover 66 includes outer end portions 70 which cooperate with end portions 52 and upturned forward edges 56 of the bottom plate 50 and the rear wall 62 to substantially completely enclose the motors 40 and brakes 42. The end portions 70 are interconnected by a relatively narrow central portion 72 which partially encloses the central portion of the guard assembly 10.

Reinforcing means 74 fixed relative to the motor protecting portion of the guard assembly 10 are shown in FIGS. 2 and 3 also. A central structural portion generally includes a portion of guard plate 50, a pair of vertically disposed walls 76 which are welded to the bottom guard plate 50, and rear wall 62. A relatively heavy reinforcing member 78 is spaced upwardly of the guard plate 50 and is disposed between the walls 76 and is secured thereto and to the upper edge of rear wall 62 by welding to form substantially a box section for the central portion. The reinforcing member 78 extends forwardly generally toward the vehicle frame 38 to where it terminates in a substantially upwardly disposed attaching portion 80, extending from the forwardly extending portion and having a plurality of mounting apertures 82 provided therein. A centrally disposed triangular gusset 84 is welded to the top of member 78 and the outer side of portion 80 to provide rigidity in the structure.

The attaching portion 80 is longitudinally spaced from a mounting block 86 secured to the top plate 30 of car body 16. A pair of spacer blocks 88 and suitable shims 90 are inserted between the attaching portion 80 of the member 78 and the mounting block 86 with the structure being fixed to the mounting block 86 by a plurality of fixing bolts 92. The fixing bolts 92 are disposed through apertures 82, with the longitudinal axes of these fixing bolts 92 being generally parallel to the longitudinal axis of the vehicle 12. Accordingly, the central portion is provided with sufficient structural integrity to transmit towing forces and particularly those imposed at an angle from the horizontal. Through such means, the reinforcing means 74 are fixed relative to the frame 38 of the vehicle 10, and the motor protecting portions of guard assembly 10 are positioned relative to motors 40.

A sheet metal cover 94 is secured to the car body 16 by a plurality of capscrews 96 and is welded to central portion 72 of cover 66 and to a pair of side gussets 98 which are also welded to inner edges of end portions 70. A pair of gussets 100 are individually welded to the upper edges of the central portion of guard plate 50 and the inner edges of forward edge portion 56 to complete the enclosure.

As best shown in FIG. 4, the bottom guard plate 50 has its outer ends attached by attaching bolts 102 to the brake mounting adapter plates 44. The outer, opposite ends of the guard plate 50 are positioned to contact surfaces 104 formed on the final drive housings 32, upon upward movement of the guard plate 50 relative to the vehicle frame 38, due to the flexing of the guard plate 50 relative to the vehicle frame 38. The final drive housings 32 thereby act as stop means fixed relative to the vehicle frame 38, with such surfaces 104 thereof being contacted by the guard plate 50 upon upward movement of the guard plate 50 relative to the vehicle frame 38, so that upward loading on the guard assembly 10 (for example, upon the machine 12 traveling over large rocks or the like) is transferred to the final drive housings 32, and to the vehicle frame 38 thereby.

A towline bracket 106 is welded to rear plate 62 and includes an aperture 108 for attachment of a towline. A pair of triangular gussets 110 are welded to the upper surface of the bracket 106 and the back face of plate 62 to support the bracket 106 under forces imposed thereon at an angle from the horizontal. The towline attachment means are thus secured to the guard assembly 10 substantially directly rearwardly of the reinforcing means 74.

Another important feature resides in the method of attaching the plates 50, 62 of the guard assembly 10 to the final drive housings 32 and mounting brackets 46 to allow slight shifting or absorption of twisting forces without applying a shear load to the attaching bolts 64, 102. In this regard, an oversize aperture 112 is provided for each of the attaching bolts 64, 102, with the aperture 112 being considerably larger than the shank diameter of the associated bolt. A spacer tube 114 is provided over the shank of each of the bolts 64, 102 with a large washer 116 interposed the outer end of the spacer tube 114 and the head of the bolt. The spacer tube 114 is slightly longer than the distance of the outer surface of the plate 50 or plate 62 and the mounting surface to which they are attached so that when each bolt is tightened thereof inwardly of the associated threaded bore of the plate 50 or plate 62, the washer 116 is spaced slightly from the structure of the guard assembly 10. This mounting arrangement allows slight shifting movement and twisting force to be absorbed by the guard assembly 10 without applying shear loads to the attaching bolts 64, 102. That is, lateral movement of the plates 50, 62 relative to the longitudinal axes of the attaching bolts associated therewith, or movement of the plates 50, 62 along the longitudinal axes of the attaching bolts associated therewith, and relative thereto, are allowed.

What is claimed is:

1. A track-type vehicle disposed for movement along a longitudinal axis thereof comprising:

a pair of laterally spaced and substantially parallel track assemblies extending in the direction of said axis;

a vehicle frame supporting said track assemblies;

a pair of laterally spaced drive motors mounted relative to said frame, each motor being operatively connected to one of said track assemblies;

a guard comprising a pair of outer motor protecting portions, and generally central reinforcing means extending between the motors and fixed relative to the motor protecting portions; and means for fixing the reinforcing means to the frame of the vehicle, to position the motor protecting portions relative to the motors.

2. The invention of claim 1 wherein the reinforcing means comprise a bottom plate, a pair of walls fixed thereto and extending upwardly therefrom, and a reinforcing member spaced upwardly of the bottom plate and fixed to the upwardly extending walls.

3. The invention of claim 2 wherein the means for fixing the reinforcing means to the frame of the vehicle comprise means for fixing the reinforcing member to the vehicle frame.

4. The invention of claim 3 wherein the means for fixing the reinforcing member to the vehicle frame comprise a plurality of fixing bolts, the reinforcing member having a portion extending generally toward the vehicle frame and an upwardly disposed portion extending from the portion extending generally toward the vehicle frame, the fixing bolts being disposed through apertures defined by the upwardly disposed portion of the reinforcing member, with the longitudinal axes of the fixing bolts disposed generally parallel to the longitudinal axis of the vehicle.

5. The invention of claim 4 wherein the reinforcing means further comprise a third wall fixed to the portion of the reinforcing member extending generally toward the vehicle frame and the upwardly disposed portion of the reinforcing member.

6. The invention of claim 5 and further comprising towline attachment means secured to the guard substantially directly rearwardly of the reinforcing means.

7. A track-type vehicle disposed for movement along the longitudinal axis thereof comprising:

a pair of laterally spaced and substantially parallel track assemblies extending in the direction of said axis;

a vehicle frame supporting said track assemblies;

a pair of laterally spaced drive motors mounted relative to said frame, each motor being operatively connected to one of said track assemblies;

a guard plate comprising a motor protecting portion;

means for securing the guard plate relative to the vehicle frame, meanwhile allowing a degree of movement of the guard plate relative to the vehicle frame; and stop means fixed relative to the vehicle frame and positioned to be contacted by the guard plate upon upward movement of the guard plate relative to the vehicle frame, to transfer upward loading on the guard plate to the stop means and to the vehicle frame.

8. The invention of claim 7 wherein the stop means comprise first and second body members fixed relative to the vehicle frame on opposite sides of the vehicle, and positioned to be contacted by opposite ends of the guard plate.

9. The invention of claim 8 wherein the means for securing the guard plate relative to the vehicle frame comprise a bracket fixed relative to the vehicle frame and defining a threaded bore, an attaching bolt disposed through an aperture defined by the guard plate; said attaching bolt being in threaded engagement with said threaded bore, the aperture being over-sized relative to the diameter of the attaching bolt, to allow lateral movement of the guard plate relative to the longitudinal axis of the attaching bolt, and means for limiting tightening of the attaching bolt inwardly of the threaded bore, to provide spacing for the guard plate to allow movement thereof generally along the longitudinal axis of the attaching bolt.

10. The invention of claim 9 and further comprising reinforcing means fixed relative to the motor protecting portion, and means for fixing the reinforcing means relative to the frame of the vehicle, and wherein said movement of the guard plate comprises flexing of the guard plate relative to the vehicle frame.

11. The invention of claim 10 wherein the reinforcing means comprise a portion of the guard plate, a pair of walls fixed thereto and extending upwardly therefrom, and a reinforcing member spaced upwardly of the guard plate and fixed to the upwardly extending walls.

12. The invention of claim 11 wherein the means for fixing the reinforcing means relative to the frame of the vehicle comprise means for fixing the reinforcing member relative to the vehicle frame.

13. The invention of claim 12 wherein the means for fixing the reinforcing member relative to the vehicle frame comprise a plurality of fixing bolts, the reinforcing member having a portion extending generally toward the vehicle frame, and an upwardly disposed portion extending from the portion extending generally toward the vehicle frame, the fixing bolts being disposed through apertures defined by the upwardly disposed portion of the reinforcing member, with the longitudinal axes of the fixing bolts disposed generally parallel to the longitudinal axis of the vehicle.

14. The invention of claim 13 wherein the reinforcing means further comprise a third wall fixed to the portion of the reinforcing member extending generally toward the vehicle frame and the upwardly disposed portion of the reinforcing member.

15. The invention of claim 14 and further comprising towline attachment means secured to the guard substantially directly rearwardly of the reinforcing means.

* * * * *